US008893366B1

(12) United States Patent
Moy et al.

(10) Patent No.: US 8,893,366 B1
(45) Date of Patent: Nov. 25, 2014

(54) TOOLS, SYSTEMS, AND METHODS FOR REMOVING CONNECTORS FROM PORTS IN A NETWORK DEVICE

(75) Inventors: Wilson Moy, Plymouth, MN (US); Shawn Simons, Waconia, MN (US); Carey Manson, Mound, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 118 days.

(21) Appl. No.: 13/403,697

(22) Filed: Feb. 23, 2012

Related U.S. Application Data

(60) Provisional application No. 61/553,446, filed on Oct. 31, 2011.

(51) Int. Cl.
*B23P 19/00* (2006.01)
*H01R 13/627* (2006.01)
*H01R 43/26* (2006.01)

(52) U.S. Cl.
CPC ............ *H01R 13/6272* (2013.01); *H01R 43/26* (2013.01)
USPC ............. 29/426.6; 29/239; 29/426.5; 29/857; 81/119; 81/176.15; 81/461

(58) Field of Classification Search
CPC .... H01R 24/64; H01R 43/26; H01R 13/6272; H01R 13/562
USPC ............. 29/239, 857, 764, 426.6, 758, 426.5; 81/119, 176.15, 461
See application file for complete search history.

(56) References Cited

U.S. PATENT DOCUMENTS

| | | | | |
|---|---|---|---|---|
| 7,020,376 | B1 * | 3/2006 | Dang et al. | 385/135 |
| 7,534,128 | B2 * | 5/2009 | Caveney et al. | 439/480 |
| 2007/0011857 | A1 * | 1/2007 | Francis et al. | 29/426.5 |
| 2009/0227139 | A1 * | 9/2009 | Caveney et al. | 439/480 |

OTHER PUBLICATIONS

Superuser, How to unplug a network calbe that's stuck?, Sep. 26, 2011, http://superuser.com/questions/340131/how-to-unplug-a-network-cable-thats-stuck.*

* cited by examiner

*Primary Examiner* — Sarang Afzali
*Assistant Examiner* — Ruth G Hidalgo-Hernande
(74) *Attorney, Agent, or Firm* — Klein, O'Neill & Singh, LLP

(57) ABSTRACT

Tools for removing connectors from ports in a network device, and related systems and methods. The tool is elongate with at least one prong at a distal end. The tool includes a very slight width relative to either its length or width, such that it can be inserted into a space adjacent a connector disposed in a port, such as between closely spaced adjacent connectors. The at least one prong is received in an anchor point, such as an opening, in the network device. Pivoting the tool applies a compressive force to a latch of the connector, disengaging the latch from its respective catch on the port, after which it can be removed by pulling it out of the port.

11 Claims, 7 Drawing Sheets

TOOLS, SYSTEMS, AND METHODS FOR REMOVING CONNECTORS FROM PORTS IN A NETWORK DEVICE

CROSS-REFERENCE TO RELATED APPLICATION

This application claims priority to provisional application Ser. No. 61/553,446, filed on Oct. 31, 2011, the entire contents of which are hereby incorporated by reference.

TECHNICAL FIELD

The present invention relates to network devices having ports and connectors.

BACKGROUND

Network systems are commonly used to move network information (may also be referred to interchangeably, as frames, packets or commands) between computing systems (for example, servers) or between computing systems and network devices (for example, storage systems). Various network devices are used to implement network communication, including switches.

A switch, or switching hub, is a computer-networking device that connects network segments. For example, a computing system may be connected to a switch so that the computing system can communicate with other devices in the network. The other devices may comprise other computing systems, data storage devices, etc. Typical switches include a plurality of external ports that receive connectors for links over which the devices in the network send and receive data and commands. A link may comprise copper wire, a fiber optic cable, etc.

It is advantageous to increase the number of ports in switches so that those switches can interconnect more devices. However, switches are typically housed in chassis, which are manufactured to standard sizes. The size of a switch is thus limited by the chassis in which it is received. The number of ports in a switch therefore cannot be increased by simply making the switch larger, because a larger switch would not fit in a standard sized chassis. Instead, to increase the number of ports in a switch the port density must be increased. But increasing port density increases the difficulty of plugging connectors into, and more particularly unplugging connectors from, the ports.

SUMMARY

The various embodiments of the present systems and methods for removing connectors from ports in a network device have several features, no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

Generally, the present embodiments facilitate easier extraction of connectors from ports so that port density of network devices can be increased. One of the present embodiments comprises a method of removing a connector from a port in a network device. The method comprises inserting handheld tool into a space adjacent the connector. The tool has a very slight thickness relative to either of its length or width. The method further comprises inserting a prong at a distal end of the tool into at least one anchor point on the network device. The method further comprises pivoting the tool toward the connector about the at least one prong in the anchor point on the network device. The method further comprises applying force to the connector with the tool while the prong remains anchored in the anchor point on the network device.

Another of the present embodiments comprises a system configured to facilitate removal of a connector from a port in a network device. The system comprises a handheld tool having a very slight thickness relative to either of its length or width, such that the tool is configured to be inserted into narrow gaps. The tool has at least one prong at its distal end. The system further comprises at least one anchor point on the network device. The at least one anchor point is configured to receive the at least one prong of the tool to anchor the distal end thereof so that the tool can be pivoted about the at least one prong to apply force to the connector.

Another of the present embodiments comprises a tool configured to facilitate removal of a connector from a port in a network device. The tool comprises an elongate, flat handle portion. The tool further comprises a flat working portion at a distal end of the handle portion. The tool further comprises at least one flat prong extending from the working portion in a direction away from the handle portion. The tool has a very slight thickness relative to either of its length or width, such that the tool is configured to be inserted into narrow gaps.

BRIEF DESCRIPTION OF THE DRAWINGS

The various embodiments of the present systems and methods for removing connectors from ports in a network device now will be discussed in detail with an emphasis on highlighting the advantageous features. These embodiments depict the novel and non-obvious systems and methods for removing connectors from ports in a network device shown in the accompanying drawings, which are for illustrative purposes only. These drawings include the following figures, in which like numerals indicate like parts.

DETAILED DESCRIPTION

Figure 1:
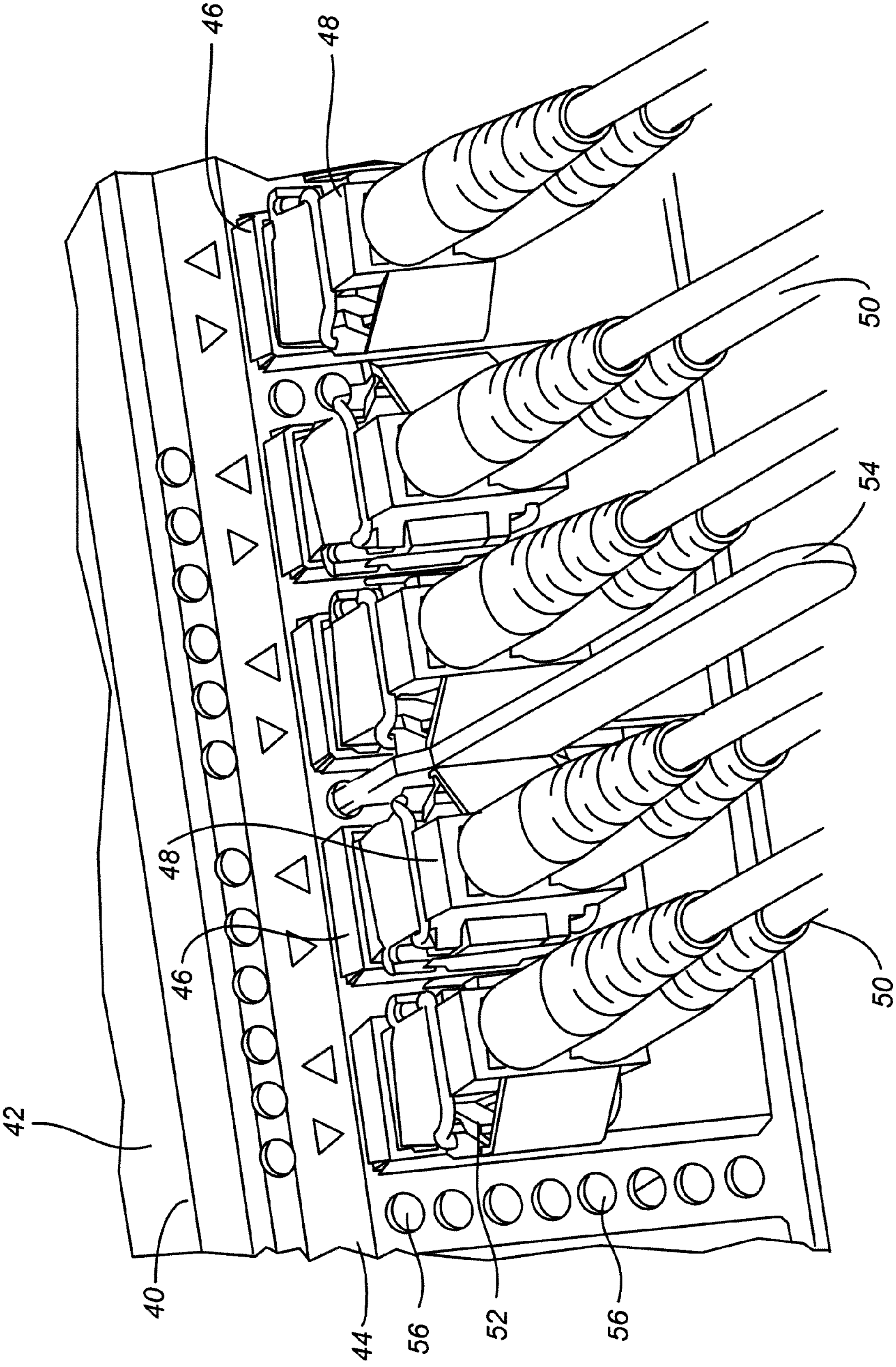
FIG. 1 is a front perspective view of one embodiment of the present systems and methods for removing connectors from ports in a network device.

The following detailed description describes the present embodiments with reference to the drawings. In the drawings, reference numbers label elements of the present embodiments. These reference numbers are reproduced below in connection with the discussion of the corresponding drawing features.

The drawings and their descriptions may indicate sizes, shapes and configurations of the various components. Such depictions and descriptions should not be interpreted as limiting. Alternative sizes, shapes and configurations are also contemplated as within the scope of the present embodiments. Also, the drawings, and their written descriptions, indicate that certain components of the apparatus are formed integrally, and certain other components are formed as separate pieces. Components shown and described herein as being formed integrally may in alternative embodiments be formed as separate pieces. Further, components shown and described herein as being formed as separate pieces may in alternative embodiments be formed integrally. As used herein the term integral describes a single unitary piece.

Figure 2:
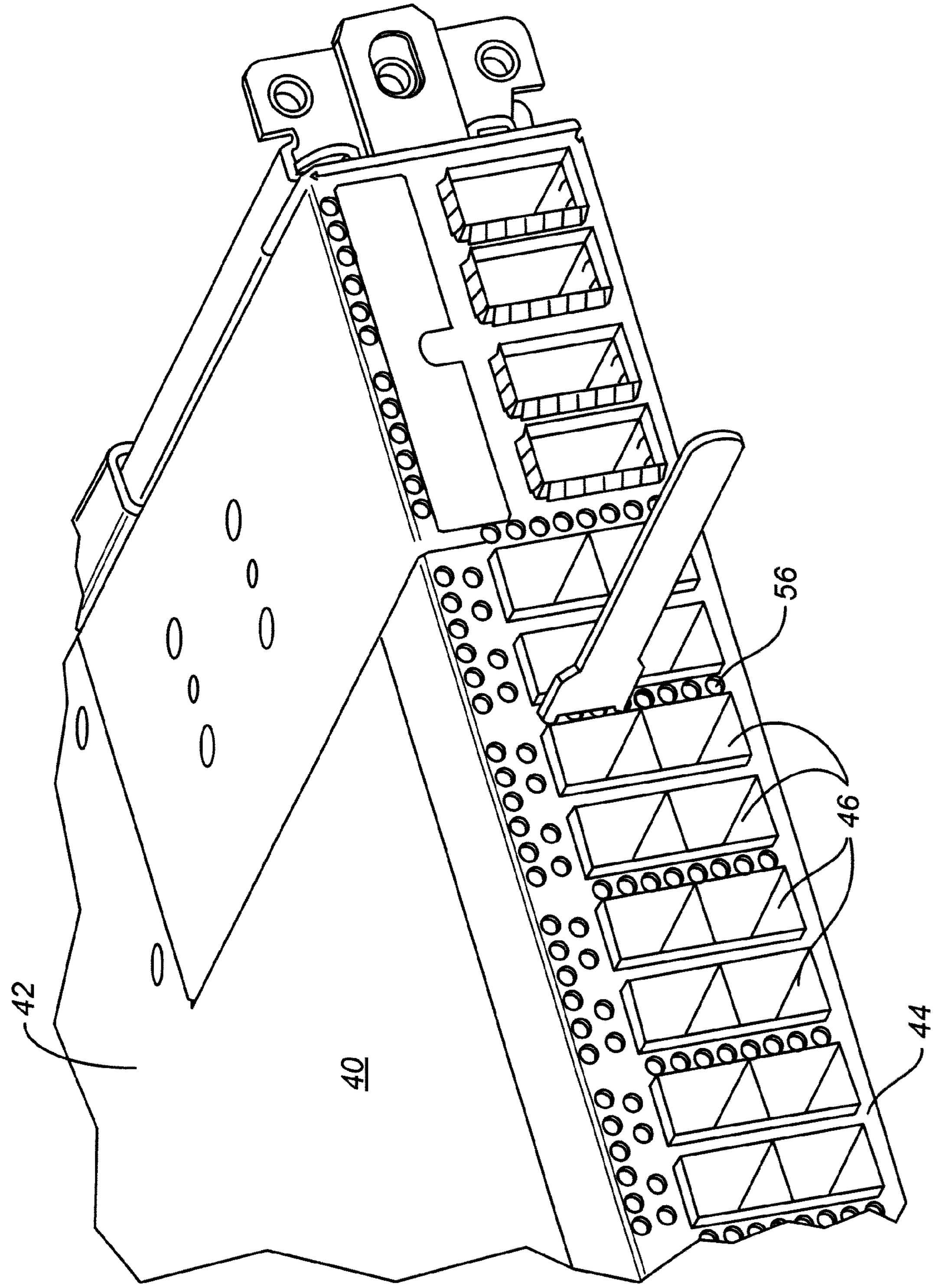
FIG. 2 is a front perspective view of the systems and methods of FIG. 1, showing the connectors removed for clarity.

With reference to FIGS. 1 and 2, one of the present embodiments comprises a network device 40. The network device 40 may be, for example, a switch, and the present embodiments will be described with reference to a switch for convenience. However, the network device 40 of the present embodiments could be any type of network device 40, and the present embodiments are not limited to a switch.

With reference to FIGS. 1 and 2, the switch 40 includes a housing 42 having a front face 44 with a plurality of ports 46. In a typical switch, the ports are located in the front face so that they are accessible to an operator. The rear face (not shown) of the switch 40 may also include ports 46. The present embodiments are not limited to a switch having ports on any particular face. The ports 46 receive connectors 48 (FIG. 1) at the ends of cables 50. The cables 50 and connectors 48 may be fiber optic, copper wire, etc.

Figure 5:
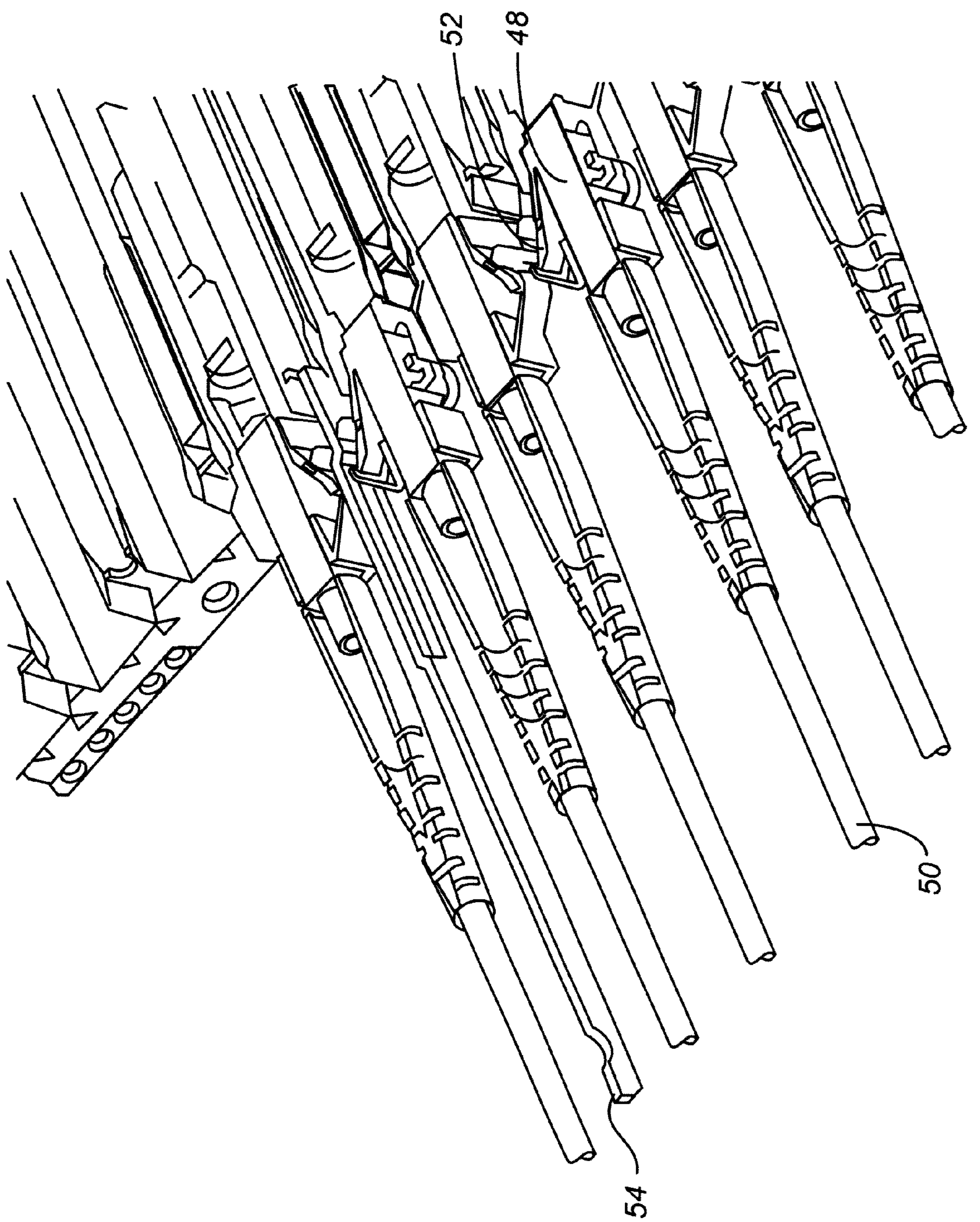
FIG. 5 is a front perspective view of the systems and methods of FIG. 1, showing portions of the system cutaway for clarity.

The ports 46 in the switch 40 are located closely adjacent one another. Thus, when connectors 48 are received within the ports 46, as shown in FIG. 1, there is very little space between adjacent connectors 48. With reference to FIGS. 1 and 5, the illustrated connectors 48 each include a cantilevered latch 52 that secures the connectors 48 within their respective ports 46. Each latch 52 includes a tab (not shown) that bears against a catch (not shown) on the port 46 so that the connector 48 cannot be withdrawn from the port 46 without depressing the latch 52 to disengage the tab from the catch. But, since there is so little space between adjacent connectors 48, it is difficult for human fingers to access and depress a given latch 52 due to interference between the fingers and adjacent connectors 48.

Figure 6:
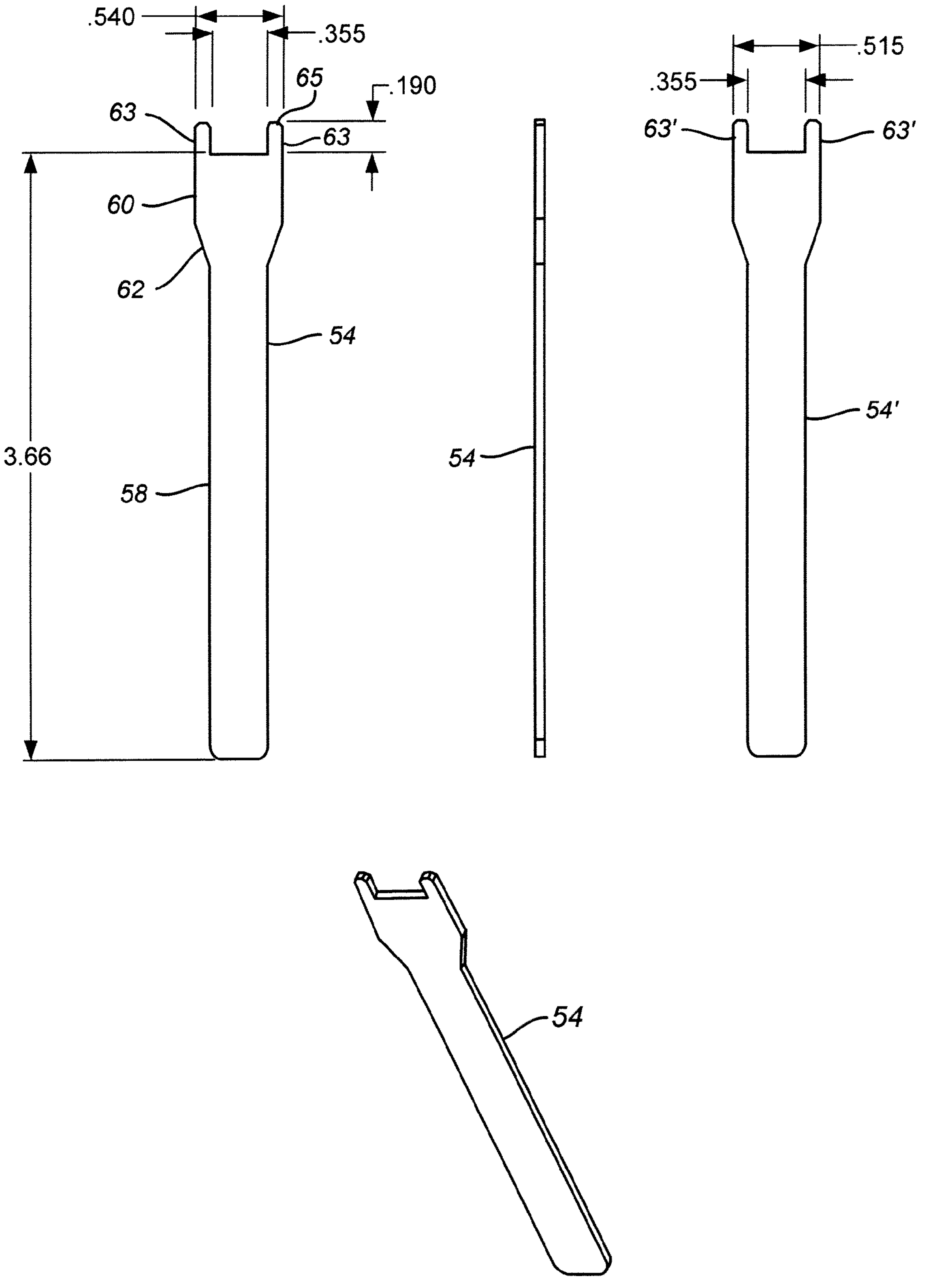
FIG. 6 is various views of one embodiment of a tool comprising a component of the present systems and methods for removing connectors from ports in a network device.

With continued reference to FIGS. 1 and 5, the present embodiments address this problem by providing a tool 54 that is thin enough to fit within the very narrow gaps between adjacent connectors 48, and by providing anchor points 56 (FIG. 1) that receive the tool 54. The tool 54 is best illustrated in FIG. 6. The tool 54 comprises an elongate, generally planar handle portion 58. The illustrated handle portion 58 is substantially rectangular in plan view, but could be any shape. A generally planar working portion 60 extends distally from a distal end of the handle portion 58. The working portion 60 has a slightly wider width than the handle portion 58 and joins the handle portion 58 at a tapered portion 62. First and second spaced prongs 63 extend distally from the working portion 60 in a direction away from the handle portion 58. The prongs 63 may be considered a part of the working portion 60. The illustrated embodiment includes two prongs 63, but any number, including one, may be provided. In the illustrated embodiment, the prongs 63 are generally planar, but could have other shapes, such as cylindrical, or any other shape. Also in the illustrated embodiment, the prongs 63 have convex rounded distal edges 65, but could have flat distal edges.

The tool 54 has a very slight thickness relative to either of its length or width. The tool 54 is thus configured to be inserted into the narrow gaps between adjacent connectors 48. For example, in one of the illustrated embodiments (left embodiment) the tool 54 has a length of 3.85" and a maximum width of 0.54" and a minimum width of 0.335", but a thickness of only 0.047". The thickness is thus less than one seventh of the minimum width, and a little more than one one-hundredth of the length. In another of the illustrated embodiments (right embodiment) the tool 54' has a length of 3.85" and a maximum width of 0.515" and a minimum width of 0.355", but a thickness of only 0.047". In other embodiments, the relative dimensions of the tool 54 may vary. For example, the thickness may be in the range of one half to one tenth of the width, and in the range of one fiftieth to five one-thousandths of the length.

In the illustrated left embodiment 54, each of the prongs 63 is 0.1025" wide and 0.190" long. The prongs 63 are 0.335" apart. In the illustrated right embodiment 54', each of the prongs 63' is 0.080" wide and 0.190" long. The prongs 63' are 0.355" apart. The size and spacing of the prongs 63 will vary depending upon the configuration of the network device 40 and/or connectors 48 with which it is used. Various standard connectors are used in the industry, and for certain applications different dimensions from those shown in FIG. 6 may be more advantageous. Thus, the illustrated dimensions are not limiting.

The tool 54 is preferably constructed of a rigid and durable material, such as a metal. Example metals are steel, stainless steel, aluminum, titanium, or any other metal or material.

With reference to FIGS. 1 and 2, the present embodiments further comprise anchor points 56 on the network device 40. The anchor points 56 comprise spaced openings 56 in the front face 44 of the network device 40. One set of openings 56 is provided for each pair of adjacent ports 46, with the openings 56 of a given set extending along a long edge of each port 46. The openings 56 are configured to receive the prongs 63 of the tool 54 to act as a pivot point for the tool 54, as discussed further below.

Figure 3:
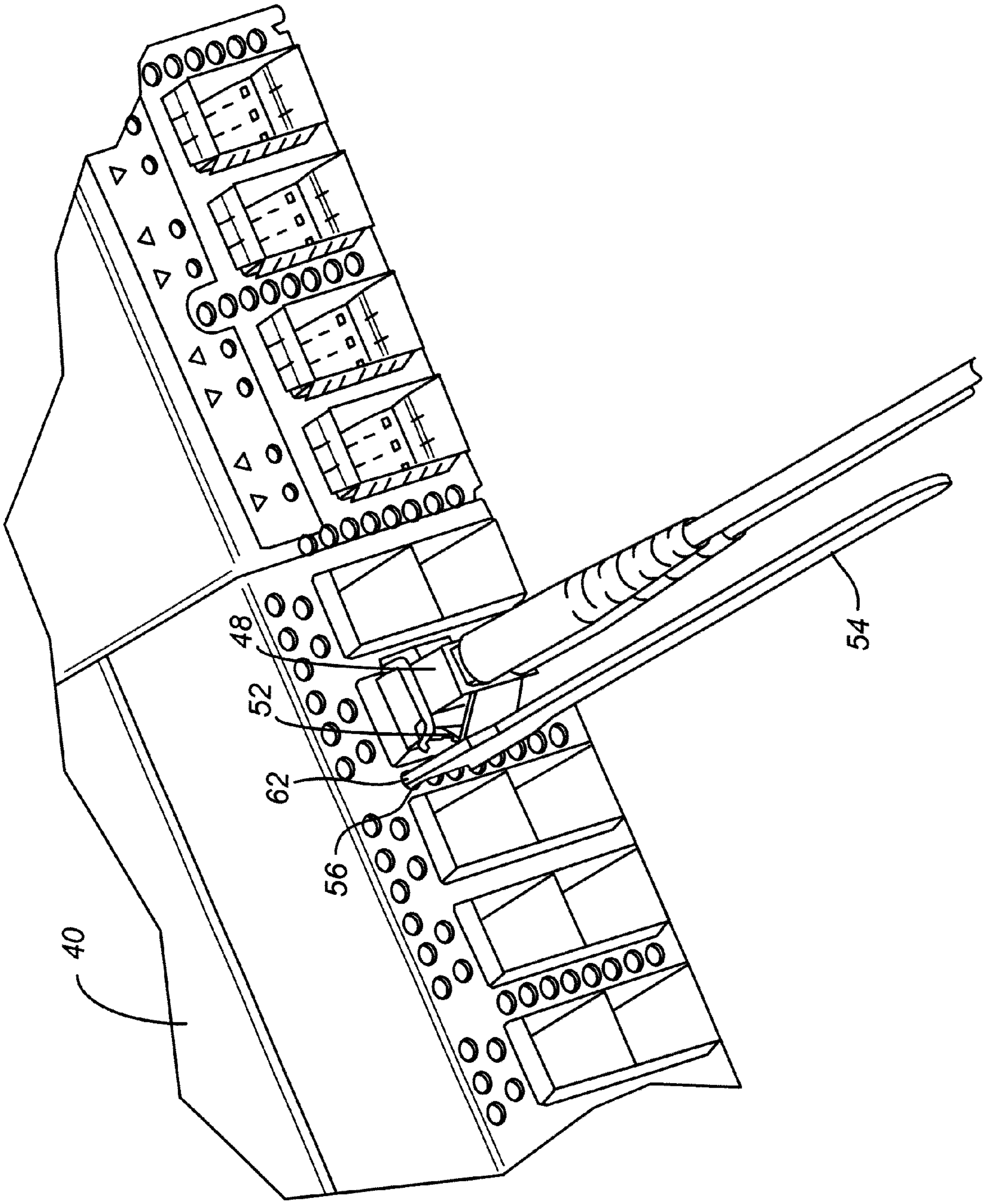
FIG. 3 is a front perspective view of the systems and methods of FIG. 1, showing all but one of the connectors removed for clarity.
Figure 4:
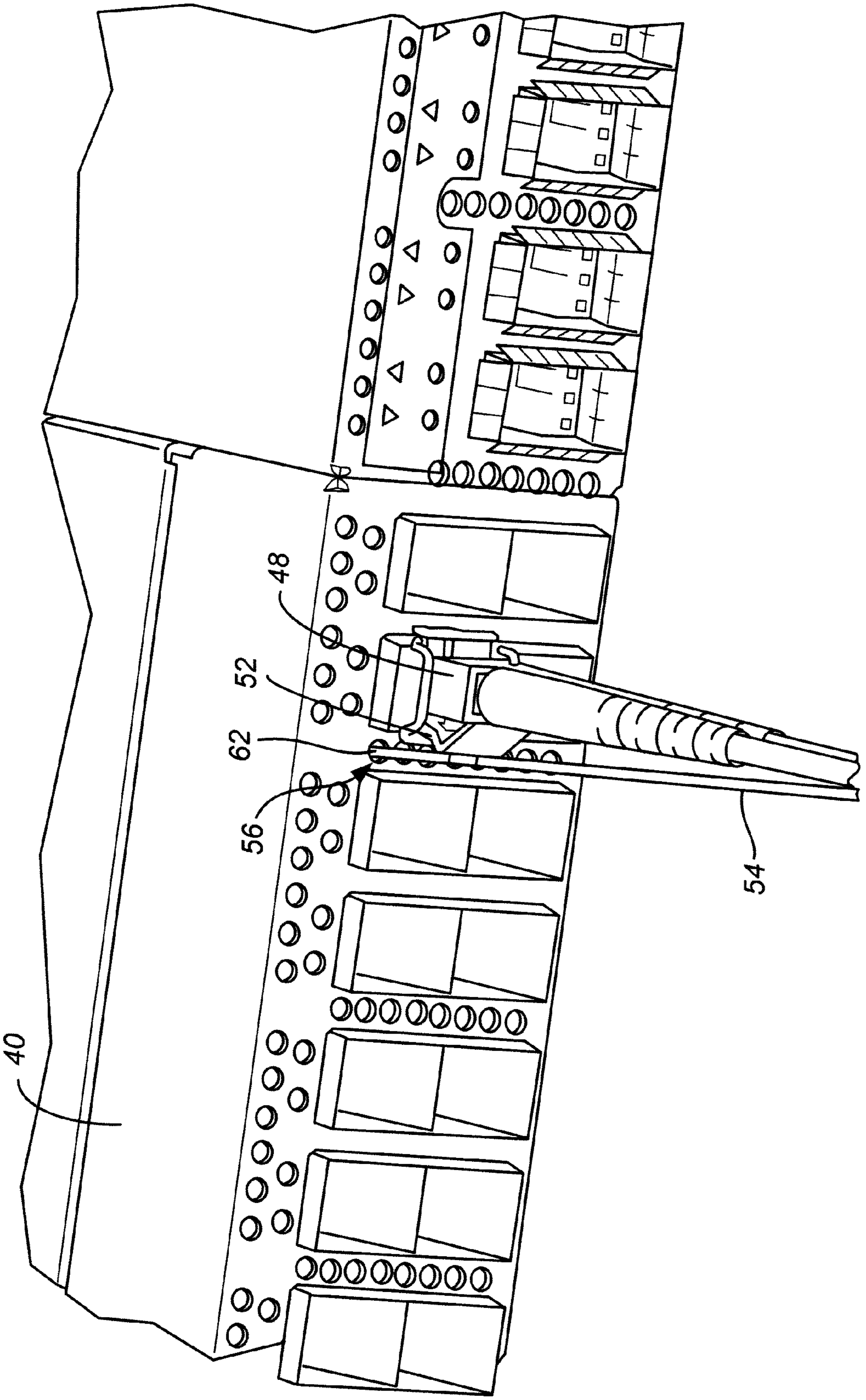
FIG. 4 is a front perspective view of the systems and methods of FIG. 4, showing a tool of the system pivoted to apply force to the connector according to an embodiment of the present methods.

To extract a connector 48 from a port 46 using the tool 54, the tool 54 is inserted in a space between adjacent connectors 48, as shown in FIGS. 1, 2 and 5. The prongs 63 of the tool 54 are received within respective ones of the openings 56. The tool 54 is then pivoted about the junction of the prongs 63 and the openings 56, as shown in FIGS. 3 and 4. The tool 54 is pivoted toward the latch 52 of the adjacent connector 48, where it bears against the latch 52 in order to depress it. Depressing the latch 52 disengages the latch 52 from its respective catch on the port 46 so that the connector 48 can be withdrawn by an applied pulling force while the latch 52 is held in the depressed position. The tool 54 thus provides access to the tight spaces between connectors 48, and leverage for depressing the latches 52 on connectors 48, thereby making it easier for an operator to withdraw connectors 48 from ports 46.

Figure 7:
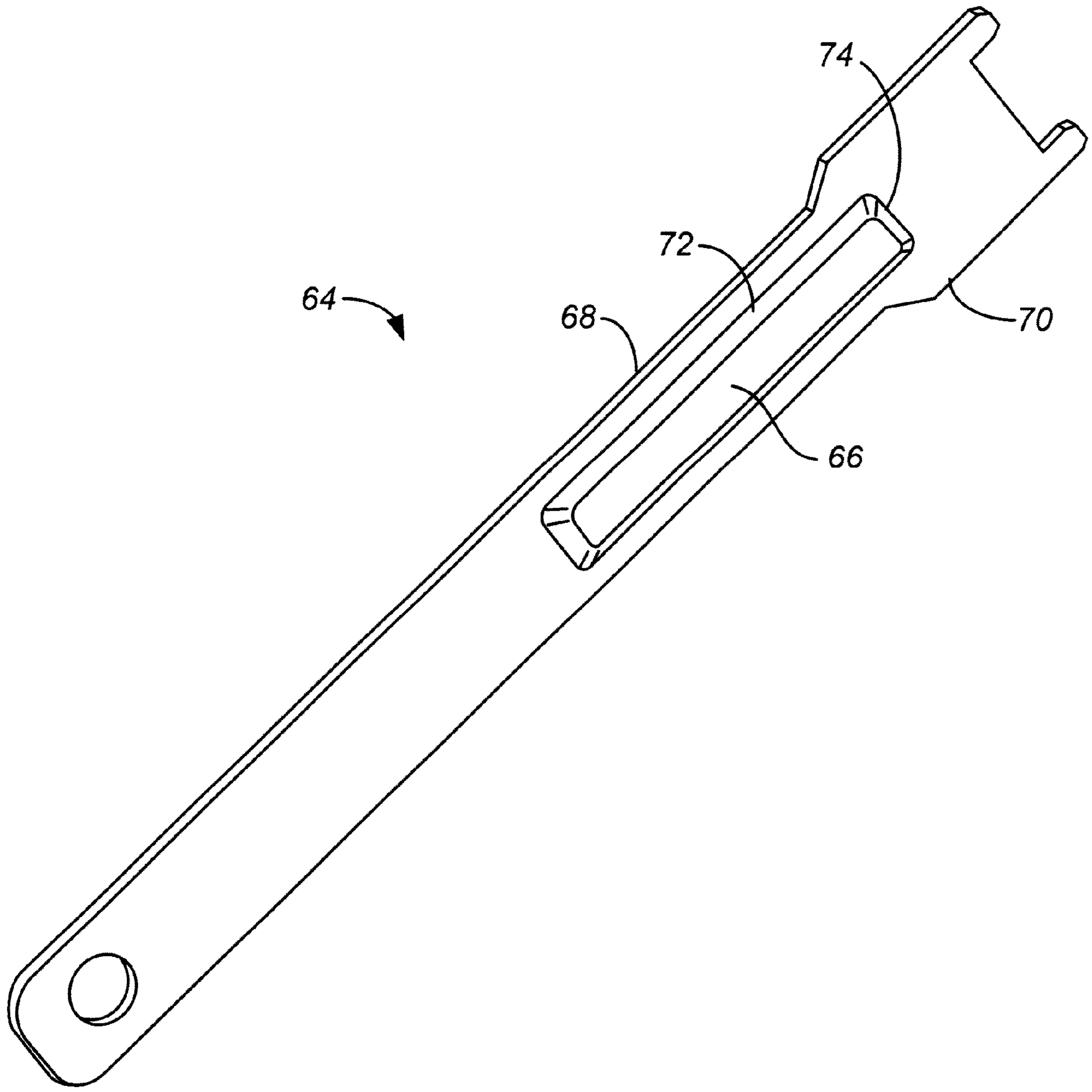
FIG. 7 is a front perspective view of one embodiment of the present systems and methods for removing connectors from ports in a network device.

FIG. 7 illustrates an alternative embodiment of the present tool 64. While the embodiment 54 of FIG. 6 is entirely flat, the embodiment of FIG. 7 includes a raised boss 66 that extends across portions of the handle portion 68 and working portion 70. The illustrated boss 66 is generally rectangular in plan view and includes sloped edges 72. However, the boss 66 could be any shape and need not include sloped edges 72. The boss 66 may include a corresponding depression (not shown) in the opposite surface of the tool 64. For example, the boss 66 and depression may be formed by stamping. The boss 66 provides multiple advantages. For example, it increases a stiffness of the tool 64, making it less likely that the tool 64 will bend as it is being used to extract a connector 48 from a port 46. It also may provide pre-compression of the latch 52 on the connector 48 prior to the step of pivoting the tool 64. The tool 64 is preferably inserted in an orientation in which the boss 66 faces the latch 52 of the connector 48 that is to be removed. If a thickness of the tool 64 in the area of the boss 66 is greater than a width of the gap between adjacent connectors 48, the latch 52 of the connector 48 that is to be removed will ride up over the sloped leading edge 74 of the boss 66 and be compressed by an amount corresponding to the thickness of the tool 64 in the area of the boss 66. Thus, the operator will not have to pivot the tool 64 as much in order to disengage the latch 52 from the port 46 in which it resides. The boss 66 thus makes the task of extracting connectors 48 from ports 46 even easier.

As discussed above, the present embodiments provide tools and methods to facilitate easier extraction of connectors from ports. The tools enable electronic devices, such as switches, to be produced with higher port densities while still making it possible to extract connectors from the ports of the devices.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention.

What is claimed is:

1. A method of removing a connector from a port in a network device, the network device including a housing having a face with at least one opening in the face adjacent the port and spaced laterally from the port, the method comprising:

inserting a handheld tool into a space adjacent the connector, the tool having a very slight thickness relative to either of its length or width;

inserting a prong at a distal end of the tool into the at least one opening in the face of the housing of the network device;

pivoting the tool toward the connector about the at least one prong in the opening in the face of the housing of the network device; and applying force to the connector with the tool while the prong remains anchored in the opening in the face of the housing of the network device.

2. The method of claim 1, wherein the connector includes a latch, and applying force to the connector with the tool comprises depressing the latch.

3. The method of claim 2, wherein the latch is cantilevered.

4. The method of claim 2, further comprising disengaging the latch from a catch on the port.

5. The method of claim 4, further comprising applying a pulling force to the connector while the latch is held in the depressed position to thereby withdraw the connector from the port.

6. A method of removing a connector from a port in a network device, the network device including a housing having a face, the port defining a first opening in the face for receiving the connector, the face of the network device further including at least a second opening adjacent the first opening, the method comprising:

inserting a handheld tool into a space adjacent the connector;

inserting a prong at a distal end of the tool into the second opening in the face of the housing of the network device;

pivoting the tool toward the connector about the at least one prong in the second opening in the face of the housing of the network device; and applying force to the connector with the tool while the prong remains anchored in the second opening in the face of the housing of the network device.

7. The method of claim 6, wherein the connector includes a latch, and applying force to the connector with the tool comprises depressing the latch.

8. The method of claim 7, wherein the latch is cantilevered.

9. The method of claim 7, further comprising disengaging the latch from a catch on the port.

10. The method of claim 9, further comprising applying a pulling force to the connector while the latch is held in the depressed position to thereby withdraw the connector from the port.

11. The method of claim 6, wherein the tool has a very slight thickness relative to either of its length or width.

* * * * *

UNITED STATES PATENT AND TRADEMARK OFFICE

CERTIFICATE OF CORRECTION

PATENT NO. : 8,893,366 B1
APPLICATION NO. : 13/403697
DATED : November 25, 2014
INVENTOR(S) : Moy et al.

It is certified that error appears in the above-identified patent and that said Letters Patent is hereby corrected as shown below:

On the title page item (56), under Other Publications in column 2, line 1, delete “calbe” and insert -- cable --, therefor.

Signed and Sealed this
Twenty-fourth Day of March, 2015

Michelle K. Lee
*Director of the United States Patent and Trademark Office*